(12) United States Patent
You et al.

(10) Patent No.: US 11,171,336 B2
(45) Date of Patent: Nov. 9, 2021

(54) ELECTRODE FOR SECONDARY BATTERY INCLUDING CARBON NANOTUBE SHEET

(71) Applicant: LG Chem, Ltd., Seoul (KR)

(72) Inventors: Min Kyu You, Daejeon (KR); In Sung Uhm, Daejeon (KR); Eun Kyung Mok, Daejeon (KR)

(73) Assignee: LG Chem, Ltd.

( * ) Notice: Subject to any disclaimer, the term of this patent is extended or adjusted under 35 U.S.C. 154(b) by 14 days.

(21) Appl. No.: 16/069,296

(22) PCT Filed: Oct. 19, 2017

(86) PCT No.: PCT/KR2017/011563
§ 371 (c)(1),
(2) Date: Jul. 11, 2018

(87) PCT Pub. No.: WO2018/080101
PCT Pub. Date: May 3, 2018

(65) Prior Publication Data
US 2019/0027755 A1  Jan. 24, 2019

(30) Foreign Application Priority Data

Oct. 26, 2016 (KR) .................. 10-2016-0139821
Oct. 16, 2017 (KR) .................. 10-2017-0133825

(51) Int. Cl.
*H01M 4/62* (2006.01)
*H01M 4/04* (2006.01)
(Continued)

(52) U.S. Cl.
CPC ......... *H01M 4/621* (2013.01); *H01M 4/0402* (2013.01); *H01M 4/0404* (2013.01);
(Continued)

(58) Field of Classification Search
CPC ............ H01M 4/0402; H01M 4/0404; H01M 4/0409; H01M 4/0435; H01M 4/139–1399
See application file for complete search history.

(56) References Cited

U.S. PATENT DOCUMENTS

2006/0046148 A1\* 3/2006 Sakai ................. H01M 4/68
429/245
2009/0181309 A1\* 7/2009 Kwon .................. H01M 4/13
429/232
(Continued)

FOREIGN PATENT DOCUMENTS

CN  104078651 A  10/2014
CN  105932297 A  9/2016
(Continued)

OTHER PUBLICATIONS

Search report from International Application No. PCT/KR2017/011563, dated Feb. 8, 2018.
(Continued)

*Primary Examiner* — Ula C Ruddock
*Assistant Examiner* — Armindo Carvalho, Jr.
(74) *Attorney, Agent, or Firm* — Lerner, David, Littenberg, Krumholz & Mentlik, LLP

(57) ABSTRACT

The present disclosure provides an electrode for a secondary battery, characterized in that a carbon nanotube sheet is provided on one surface or both surfaces of a current collector, and an electrode mixture layer containing an electrode active material is applied on the carbon nanotube sheet.

7 Claims, 3 Drawing Sheets

(51) Int. Cl.
*H01M 4/13* (2010.01)
*H01M 4/66* (2006.01)
*H01M 4/139* (2010.01)

(52) U.S. Cl.
CPC ....... *H01M 4/0435* (2013.01); *H01M 4/0471* (2013.01); *H01M 4/13* (2013.01); *H01M 4/139* (2013.01); *H01M 4/663* (2013.01); *H01M 4/667* (2013.01); *H01M 4/661* (2013.01)

(56) References Cited

U.S. PATENT DOCUMENTS

| | | | |
|---|---|---|---|
| 2013/0045413 | A1 | 2/2013 | Wang et al. |
| 2013/0202961 | A1 | 8/2013 | Hagen et al. |
| 2013/0209880 | A1 | 8/2013 | Nozue et al. |
| 2013/0316244 | A1 | 11/2013 | Zhang et al. |
| 2014/0050976 | A1* | 2/2014 | Nagai .................. H01M 4/131 429/211 |
| 2014/0093769 | A1 | 4/2014 | Busnaina et al. |
| 2014/0295068 | A1* | 10/2014 | Nanba ................ H01M 4/0404 427/122 |
| 2015/0228982 | A1* | 8/2015 | Shibano ................ H01G 11/06 429/245 |
| 2016/0049662 | A1* | 2/2016 | Kim .................... H01M 4/667 429/211 |
| 2016/0181600 | A1* | 6/2016 | Omoda ................. H01M 4/38 429/212 |

FOREIGN PATENT DOCUMENTS

| | | |
|---|---|---|
| JP | 2014212027 A | 11/2014 |
| JP | 2015043309 A | 3/2015 |
| JP | 2015207523 A | 11/2015 |
| JP | 2016103402 A | 6/2016 |
| KR | 20060083171 A | 7/2006 |
| KR | 20080095980 A | 10/2008 |
| KR | 20090078656 A | 7/2009 |
| KR | 20130116895 A | 10/2013 |
| KR | 20140051860 A | 5/2014 |
| KR | 101502538 B1 | 3/2015 |
| KR | 20150042350 A | 4/2015 |
| KR | 20150050075 A | 5/2015 |
| KR | 20160040095 A | 4/2016 |
| KR | 20160041299 A | 4/2016 |
| WO | 2016019309 A1 | 2/2016 |

OTHER PUBLICATIONS

Extended European Search Report including the Written Opinion for Application No. EP 17865202.0 dated Feb. 1, 2019.

* cited by examiner

ELECTRODE FOR SECONDARY BATTERY INCLUDING CARBON NANOTUBE SHEET

CROSS-REFERENCE TO RELATED APPLICATIONS

This application is a national phase entry under 35 U.S.C. § 371 of International Application No. PCT/KR2017/011563 filed on Oct. 19, 2017, which claims priority to Korean Patent Application Nos. 10-2016-0139821 filed on Oct. 26, 2016, and 10-2017-0133825 filed on Oct. 16, 2017, the disclosures of which are incorporated herein by reference.

TECHNICAL FIELD

The present disclosure relates to an electrode for a secondary battery including a carbon nanotube sheet.

BACKGROUND ART

Recently, the price of an energy source has risen due to the depletion of fossil fuels and interest in environmental pollution has been amplified, and thus the demand for environmentally-friendly alternative energy sources has become an essential factor for future life. Accordingly, research into various power production technologies such as nuclear power production technology, solar power production technology, wind power production technology, tidal power production technology, and the like has been continuing, and great interest in power storage devices for more efficient use of the energy produced through such technologies has also been continuing.

In particular, as technical development of and the demand on mobile devices have been increased, the demand on a battery as an energy source has been rapidly increased, and a lot of research has been conducted on a battery that can meet various demands.

Typically, in terms of a shape of a battery, there is a high demand for a prismatic type secondary battery and a pouch-type secondary battery that can be applied to products such as mobile phones having a thin thickness, and in terms of materials of the battery, there is a high demand for lithium secondary batteries such as lithium ion batteries and lithium ion polymer batteries having advantages such as high energy density, discharge voltage, output stability, and the like.

Generally, such a lithium secondary battery is charged and discharged while repeating a process in which lithium ions in a positive electrode are intercalated into a negative electrode and deintercalated.

However, in such a lithium secondary battery, a theoretical capacity of the battery varies depending on the type of electrode active material, and charging and discharging capacities decrease as a cycle progresses.

Particularly, the biggest cause of this phenomenon is that the electrode mixture layer fails to perform its function as separation occurs between electrode active materials or between an electrode mixture layer containing an electrode active material and a current collector by a change in a volume of an electrode caused by the progress of charging and discharging of the battery.

In addition, in a process of intercalating and deintercalating lithium ions, the lithium ions intercalated into the negative electrode are not properly deintercalated, and active sites of the negative electrode are decreased. As a result, the charge/discharge capacity and lifetime characteristics of the battery may decrease as the cycle progresses.

Moreover, recent attempts have been made to increase an energy density of a secondary battery. To this end, an amount of loading of an electrode active material is increased, while a content of a binder is increased.

However, this results in a problem in that adhesion between an electrode mixture layer and a current collector is rapidly lowered, which degrades performance and safety of the secondary battery.

In order to solve this problem, a method of increasing a bonding force between the electrode mixture layer and the current collector by using a high molecular weight binder or coating a separate material such as carbon on a surface of the current collector has been attempted. However, the binder is moved to the surface of the electrode mixture layer together with a solvent to be dried, and thus adhesion of the electrode mixture layer to the current collector is lowered or resistance is increased.

Particularly, such a problem is recognized as a very important point at the present time when the demand for a flexible secondary battery which can be deformed in shape along with the development of a wearable device is increasing.

Therefore, there is a high need for a technique capable of fundamentally solving such problems.

DISCLOSURE

Technical Problem

The present disclosure is provided to solve the above-described problems of the related art and technical problems which have been identified in the past.

The inventors of the present application have conducted intensive research and various experiments and, as will be described later, by constructing an electrode mixture layer to be coated in a state that a carbon nanotube sheet is provided on a current collector, at least a part of an electrode mixture slurry penetrates into and bonds to a pore to improve adhesion between the electrode mixture layer and the current collector, thereby solving a problem of deintercalation of the electrode mixture layer. It is possible to realize a more flexible secondary battery with respect to deformation of a shape thereof based on the improved adhesion of the electrode mixture layer and minimize a restriction on a shape of the secondary battery and a mounting space in a device, and by reducing a content of a binder contained to fix the electrode mixture layer on the current collector, it is possible to suppress an increase in resistance due to the excessive content of the binder and further contain the electrode active material with respect to the reduced binder content and thus it is possible to increase a capacity and energy density of an electrode and improve capacity characteristics of the secondary battery. Thus, the present disclosure has been completed.

Technical Solution

According to an aspect of the present disclosure, there is provided an electrode for a secondary battery, including: a carbon nanotube sheet provided on one surface or both surfaces of a current collector; and an electrode mixture layer containing an electrode active material applied to the carbon nanotube sheet.

Therefore, at least a part of an electrode mixture slurry penetrates into and bonds to a pore of a carbon nanotube sheet to improve adhesion between the electrode mixture layer and the current collector. Thus, the problem caused by deintercalation of the electrode mixture layer may be solved. It may be possible to realize a more flexible secondary battery with respect to deformation of a shape based on the improved adhesion of the electrode mixture layer and minimize a restriction on the shape of the secondary battery and a mounting space in a device, and by reducing the content of the binder contained for fixing the electrode mixture layer on the current collector, it is possible to suppress an increase in resistance due to the excessive content of the binder and further contain the electrode active material with respect to the reduced binder content. Therefore, a capacity and energy density of an electrode may be increased, and capacity characteristics of the secondary battery may be improved.

In one specific example, the carbon nanotube sheet may have a sheet structure including a plurality of pores.

Therefore, the carbon nanotube sheet can serve as a structure for increasing the adhesion of the electrode mixture layer to the current collector. More specifically, since at least a part of the electrode mixture slurry which forms the electrode mixture layer penetrates into and bonds to the pores of the carbon nanotube sheet it is possible to increase the adhesion of the electrode mixture layer to the current collector.

At this time, the carbon nanotube sheet may have a porosity of 40% to 80%.

When the porosity of the carbon nanotube sheet is outside of the above range and is too small, the electrode mixture slurry cannot sufficiently penetrate into the pores of the carbon nanotube sheet and the adhesion of the electrode mixture layer cannot be improved, and conversely, when the porosity of the carbon nanotube sheet is out of the above range and is excessively large, the electrode mixture slurry excessively penetrates into the pores of the carbon nanotube sheet. As a result, the carbon nanotube sheet is spaced apart from the current collector and may be placed in the electrode mixture layer and thus effect of improving the adhesion of the electrode mixture layer through the carbon nanotube sheet cannot be exhibited.

The electrode mixture layer may be formed by applying an electrode mixture slurry in which an electrode active material, a conductive material, and a binder are mixed onto a carbon nanotube sheet provided on one surface or both surfaces of a current collector, and drying and rolling the carbon nanotube sheet.

Here, the electrode mixture slurry may be a structure in which at least a part of the electrode mixture slurry penetrates into and bonds to pores of the carbon nanotube sheet to form an electrode mixture layer.

That is, the electrode mixture slurry constituting the electrode mixture layer may be a structure including a binder, as in a conventional case. In this case, at least a part of the electrode mixture slurry penetrates into and bonds to the pores of the carbon nanotube sheet to form the electrode mixture layer, and thus the carbon nanotube sheet can serve as a structure for increasing the adhesion of the electrode mixture layer.

In particular, the carbon nanotube sheet may have a structure in which the carbon nanotube sheet is bonded to the current collector by the binder of the electrode mixture slurry penetrating into the pore.

Therefore, the binder penetrating into the pores of the carbon nanotube sheet can act to increase the adhesion of the carbon nanotube sheet itself to the current collector between the carbon nanotube sheet and the current collector.

In addition, since the carbon nanotube sheet is not dissolved in the electrode mixture slurry but is fixed on the current collector by the electrode mixture slurry, the adhesion of the electrode mixture layer can be improved, unlike in a case in which a binder layer is separately coated onto the current collector, and since the binder does not move on a surface of the electrode mixture layer together with the solvent during a drying process, the adhesion of the electrode mixture layer can be more effectively improved.

A thickness of the carbon nanotube sheet may be 5 to 20 micrometers.

When the thickness of the carbon nanotube sheet is less than 5 micrometers, the thickness of the carbon nanotube sheet is too thin to serve as a structure for improving the adhesion of the electrode mixture layer between the electrode mixture layer and the current collector. Thus, an effect of improving adhesion of a desired electrode mixture layer may not be exhibited, handling of the carbon nanotube sheet is not easy, and processability for manufacturing electrodes may be deteriorated.

On the contrary, when the thickness of the carbon nanotube sheet is more than 20 micrometers, the thickness of the carbon nanotube sheet is too thick so that the electrode mixture slurry penetrates into the pores of the carbon nanotube sheet to bond with the current collector. Thus, the effect of improving the adhesion of the desired electrode mixture layer may not be exhibited and the thickness of the carbon nanotube sheet is excessively thick when compared with a limited electrode thickness, and consequently a loading amount of the electrode mixture layer is reduced. Also, there is a problem in that a density of an electrode is lowered.

In one specific example, the carbon nanotube sheet may be provided on at least 50% of a total area of one surface of the current collector. More specifically, the carbon nanotube sheet may be provided on 100% of the total area of one surface of the current collector.

When the carbon nanotube sheet is provided on less than 50% of the total area of one surface of the current collector, an additional area of the carbon nanotube sheet is excessively narrow and the effect of improving the adhesion of the electrode mixture layer is sufficiently exhibited. As the adhesion of the electrode mixture layer to the current collector shows a local difference, partial deintercalation of the electrode mixture layer may more easily occur.

Further, the present disclosure provides an apparatus for manufacturing the electrode for a secondary battery, the apparatus including: a first roller on which a long sheet-like carbon nanotube sheet is wound; a second roller on which a long sheet-like current collector is wound; a third roller configured to simultaneously wind the current collector and the carbon nanotube sheet in a state that the carbon nanotube sheet is provided on the current collector; a fourth roller configured to simultaneously support the current collector and the carbon nanotube sheet on a lower surface of the current collector between the first roller or the second roller and the third roller so that the carbon nanotube sheet adheres to an upper surface of the current collector; and a slurry applying portion configured to apply an electrode mixture slurry to an upper surface of the carbon nanotube sheet provided on the current collector between the third roller and the fourth roller.

That is, the carbon nanotube sheet is placed on the current collector during the application of the electrode mixture slurry to the upper surface of the long sheet-like current collector to be positioned between the electrode mixture slurry and the upper surface of the current collector, and the electrode mixture slurry penetrates into and bonds to pores of the carbon nanotube sheet to form an electrode mixture layer.

Therefore, the secondary battery electrode manufacturing apparatus may be constructed by adding only the first roller that can add the long sheet-shaped carbon nanotube sheet to a conventional secondary battery electrode manufacturing apparatus. Therefore, it is not necessary to fabricate a separate secondary battery electrode manufacturing apparatus Thus, it is possible to effectively save a cost of manufacturing the electrode manufacturing apparatus.

In this case, the first roller may be located at the same or relatively low height with respect to an extension line connecting the third roller and the fourth roller so that the carbon nanotube sheet is held in a tensioned state by a tension applied to the carbon nanotube sheet.

The second roller may be located at a relatively low height relative to the first roller with respect to the extension line so that the current collector is supplied to a portion opposite the slurry applying portion.

Therefore, the carbon nanotube sheet may be supported by the fourth roller in the process of being wound around the third roller via the fourth roller and may be maintained in the tensioned state, and thus, it is possible to easily prevent defects such as the carbon nanotube sheet not being completely adhered to the current collector, one part overlapping another part, or the like.

Further, the second roller around which the current collector is wound is located at a lower height than the first roller around which the carbon nanotube sheet is wound, and thus the carbon nanotube sheet and the current collector can be more easily positioned on the current collector in a winding and transporting process by the third roller without a complicated additional process.

The secondary battery electrode manufacturing apparatus may further include: a drying unit configured to dry an electrode mixture slurry applied onto the carbon nanotube sheet; and a roller configured to roll the carbon nanotube sheet and the dried electrode mixture slurry located on the current collector to form an electrode mixture layer.

In this case, the drying unit and the roller may be located between the fourth roller and the third roller based on a feeding direction of the carbon nanotube sheet and the current collector such that drying and rolling may be performed on the electrode mixture slurry provided on the carbon nanotube sheet on the current collector.

Meanwhile, the present disclosure provides a method of manufacturing the electrode for a secondary battery. The method may include: a) a process of bringing a carbon nanotube sheet into close contact with a current collector by simultaneously and continuously supplying the carbon nanotube sheet onto the current collector, b) a process of applying an electrode mixture slurry onto the carbon nanotube sheet in close contact with the current collector; and c) a process of drying and rolling the current collector coated with the electrode mixture slurry to form an electrode mixture layer.

Therefore, since the carbon nanotube sheet is supplied onto the current collector while the current collector is supplied to apply the electrode mixture slurry to the current collector, there is no need to add a complicated process to provide the carbon nanotube sheet, and thus an increase in time and cost may be minimized.

That is, conventionally, in order to interpose the carbon nanotube sheet between the current collector and the electrode mixture layer, a process of separately coating carbon nanotubes onto the current collector before coating the electrode slurry on the current collector was required. However, since sheet-shaped carbon nanotubes are supplied onto the current collector while the electrode mixture slurry is supplied, the present disclosure does not require a carbon nanotube coating process and thus an increase in time and cost due to coating may be minimized.

In this case, in process a), the carbon nanotubes may be fed to a position lower than or equal to a height to which an electrode mixture slurry is applied;

The current collector may be provided at a relatively low height when compared with the carbon nanotube sheet.

Therefore, by adjusting only the height at which the carbon nanotubes and the current collector are supplied, adhesion of the electrode mixture layer to the current collector can be improved so that no separate process for providing the carbon nanotubes on the current collector is required. Thus, it is possible to utilize a conventional secondary battery electrode manufacturing method or process as it is, thereby minimizing an increase in manufacturing cost and time.

In addition, at least a part of the electrode mixture slurry applied in process b) may penetrate into and bond to pores of the carbon nanotube sheet to form the electrode mixture layer.

Therefore, the carbon nanotube sheet can serve as a structure for increasing the adhesion between the electrode mixture layer and the current collector.

The remaining configuration of the electrode for a secondary battery, the apparatus for manufacturing the electrode, and the method for manufacturing the electrode, except for the structure or configuration, are well known in the art, and thus detailed descriptions thereof will be omitted herein.

Advantageous Effects

As described above, an electrode for a secondary battery according to the present disclosure is configured such that an electrode mixture layer is applied in a state in which a carbon nanotube sheet is provided on a current collector so that at least a part of the electrode mixture layer can penetrate into and bond to a pore of the carbon nanotube sheet to improve adhesion between an electrode mixture layer and the current collector, thereby solving the problem of deintercalation of the electrode mixture layer.

Further, on the basis of the improved adhesion of the electrode mixture layer, it is possible to realize a more flexible secondary battery against deformation of a shape so that it is easy to apply a flexible battery to a device, and a constraint on the shape of the secondary battery and a mounting space in the device can be minimized.

Furthermore, by reducing a content of a binder contained to fix the electrode mixture layer on the current collector, it is possible to suppress an increase in resistance due to an excessive content of the binder. Since it is possible to further include an electrode active material related to the reduced binder content, a capacity and energy density of an electrode can be increased, and capacity characteristics of a secondary battery can be improved.

The conventional method of manufacturing an electrode further includes a process of separately coating a carbon nanotube on a current collector before coating an electrode slurry on the current collector to interpose a carbon nanotube layer between the current collector and an electrode mixture layer. The present disclosure has an advantage in that the carbon nanotube layer can be added between the current collector and the electrode mixture layer through a relatively easy method of intercalating a carbon nanotube sheet into the electrode slurry when coating the electrode slurry.

DETAILED DESCRIPTION OF THE PREFERRED EMBODIMENTS

Hereinafter, exemplary embodiments of the present disclosure will be described in detail with reference to the drawings, but the scope of the present disclosure is not limited thereto.

Figure 1:
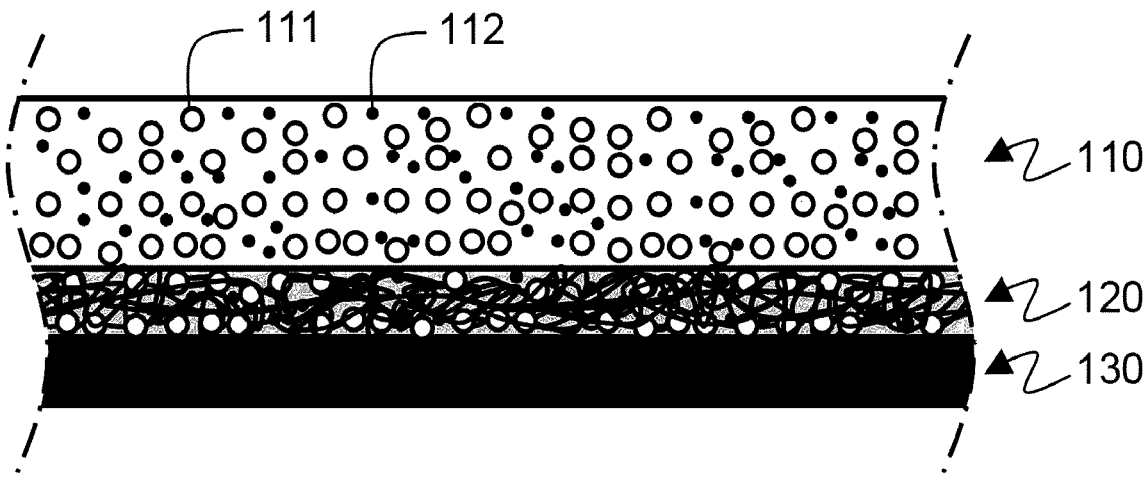
FIG. 1 is a schematic view illustrating a vertical sectional structure of an electrode for a secondary battery according to an embodiment of the present disclosure.

FIG. 1 is a schematic view schematically illustrating a vertical sectional structure of an electrode for a secondary battery according to an embodiment of the present disclosure.

Referring to FIG. 1, an electrode 100 for a secondary battery includes a carbon nanotube sheet 120, wherein the carbon nanotube sheet 120 is provided on an upper surface of a current collector 130, and an electrode mixture layer 110 including an electrode active material 111 and a binder 112.

The carbon nanotube sheet 120 has a structure including a plurality of pores so that a part of the electrode active material 111 and the binder 112 penetrate into and bond to the pores of the carbon nanotube sheet 120 to form an electrode mixture layer 110.

Accordingly, the carbon nanotube sheet 120 functions as a structure for further enhancing an adhesion between the electrode mixture layer 110 and the current collector 130.

Figure 2:
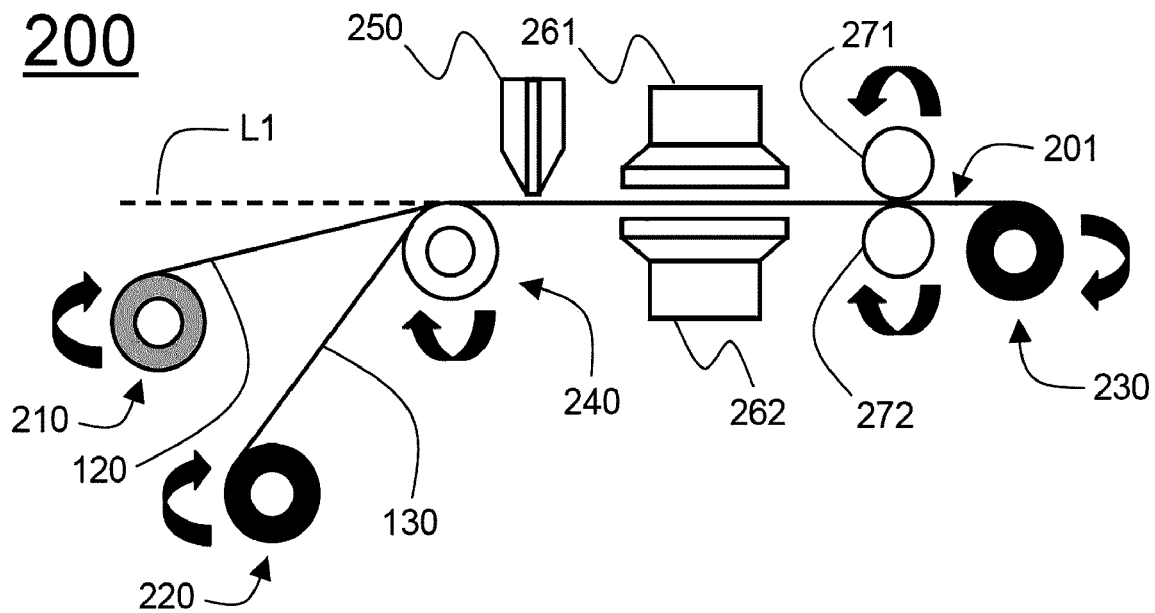
FIG. 2 is a schematic view schematically illustrating the structure of an electrode manufacturing apparatus for manufacturing the electrode of FIG. 1.

FIG. 2 is a schematic view schematically illustrating a structure of an electrode manufacturing apparatus for manufacturing the electrode of FIG. 1.

Referring to FIG. 2, a secondary battery electrode manufacturing apparatus 200 includes a first roller 210, a second roller 220, a third roller 230, a fourth roller 240, a slurry applying portion 250, drying units 261 and 262, and rollers 271 and 272.

The long sheet-like carbon nanotube sheet 120 is wound around the first roller 210, and the wound carbon nanotube sheet 120 is fed while being rotated clockwise.

The long sheet-like current collector 130 is wound around the second roller 220 and is rotated in a clockwise direction to supply the wound current collector 130.

The third roller 230 simultaneously winds an electrode sheet 201 on which an electrode mixture layer is formed in a state in which the carbon nanotube sheet 120 is provided on the current collector 130.

The fourth roller 240 is disposed between the first roller 210 and the second roller 220, and the third roller 230 and is disposed below the current collector 130 to simultaneously support the current collector 130 and the carbon nanotube sheet 120 supplied from the first roller 210 and the second roller 220.

The first roller 210 is located at a relatively low height with respect to an extension line L1 connecting the third roller 230 and the fourth roller 240, and the second roller 220 is located at a relatively low height with respect thereto, the second roller 120 is located at a relatively low height relative to the first roller 210 so that the current collector 130 is supplied to a lower portion of the carbon nanotube sheet 120.

The carbon nanotube sheet 120 is supported by the fourth roller together with the current collector 130 while being provided on the current collector 130 so that the carbon nanotube sheet 120 is held on an upper surface of the current collector 130 such that the current collector 130 and the carbon nanotube sheet 120 may be positioned to completely be in close contact with each other.

The slurry applying portion 250 is disposed behind the fourth roller 240 based on a supply direction of the current collector 130 and the carbon nanotube sheet 120. The slurry applying portion 250 applies an electrode mixture slurry onto an upper surface of the carbon nanotube sheet 120 placed on the current collector 130.

The drying units 261 and 262 are located on the upper and lower surfaces of the current collector 130 behind the slurry applying portion 250, respectively. The drying units 261 and 262 dry the electrode mixture slurry provided on the upper surface of the carbon nanotube sheet 120.

The rollers 271 and 272 are constituted by a first roller 271 located on the upper surface of the carbon nanotube sheet 120 to which the electrode mixture slurry is applied and a second roller 272 located on the lower surface of the current collector 130.

The first roller 271 and the second roller 272 are rotated in opposite directions to roll the electrode mixture slurry on the carbon nanotube sheet 120 to manufacture the electrode sheet 201 on which the electrode mixture layer is formed.

The rolled electrode sheet 201 is wound around the third roller 230.

Hereinafter, the present disclosure will be described in detail with reference to examples of the present disclosure, but the scope of the present disclosure is not limited thereto.

Example 1

A negative electrode mixture slurry was prepared by thoroughly mixing natural graphite as a negative electrode active material, a PVdF binder, and a natural graphite conductive material in NMP at a weight ratio of 90:4:6 (negative electrode active material:binder:conductive material). A 5 micrometer thick carbon nanotube sheet was placed on a 20 micrometer thick Cu foil so that the carbon nanotube sheet was completely adhered thereto. The negative electrode mixture slurry prepared above was applied thereto, dried, and rolled to prepare a negative electrode.

Example 2

The same negative electrode as in Example 1 was prepared except that the thickness of the carbon nanotube sheet was 10 micrometers.

Example 3

The same negative electrode as in Example 1 was prepared except that the thickness of the carbon nanotube sheet was 15 micrometers.

Example 4

The same negative electrode as in Example 1 was prepared, except that the thickness of the carbon nanotube sheet was 20 micrometers.

Comparative Example 1

The same negative electrode as in Example 1 was prepared except that no carbon nanotube sheet was provided on the Cu foil.

Comparative Example 2

The same negative electrode as in Example 1 was prepared except that the thickness of the carbon nanotube sheet was 3 micrometers.

Experimental Example 1

Adhesion Test 1

The negative electrode prepared in each of Examples 1 and 2 and Comparative Examples 1 and 2 was cut and fixed on a slide glass, and then 180-degree peel strength was measured while peeling a current collector therefrom. The results are shown in Tables 1 and FIG. 3. Evaluation was carried out by measuring the peel strength five times in each case. In each of the above cases, peeling strength at which the negative electrode mixture layer was deintercalated and peeling strength at which a carbon nanotube sheet portion was deintercalated were successively measured to show a range.

TABLE 1

|  | Adhesion (gf/cm) when negative electrode mixture layer was deintercalated | Adhesion (gf/cm) when carbon nanotube sheet was deintercalated |
|---|---|---|
| Example 1 | 78~83 | 110~160 |
| Example 2 | 78~84 | 110~160 |
| Example 3 | 79~85 | 115~170 |
| Example 4 | 80~85 | 120~170 |
| Comparative Example 1 | 38~42 | — |
| Comparative Example 2 | 51~59 | — |

Figure 3:
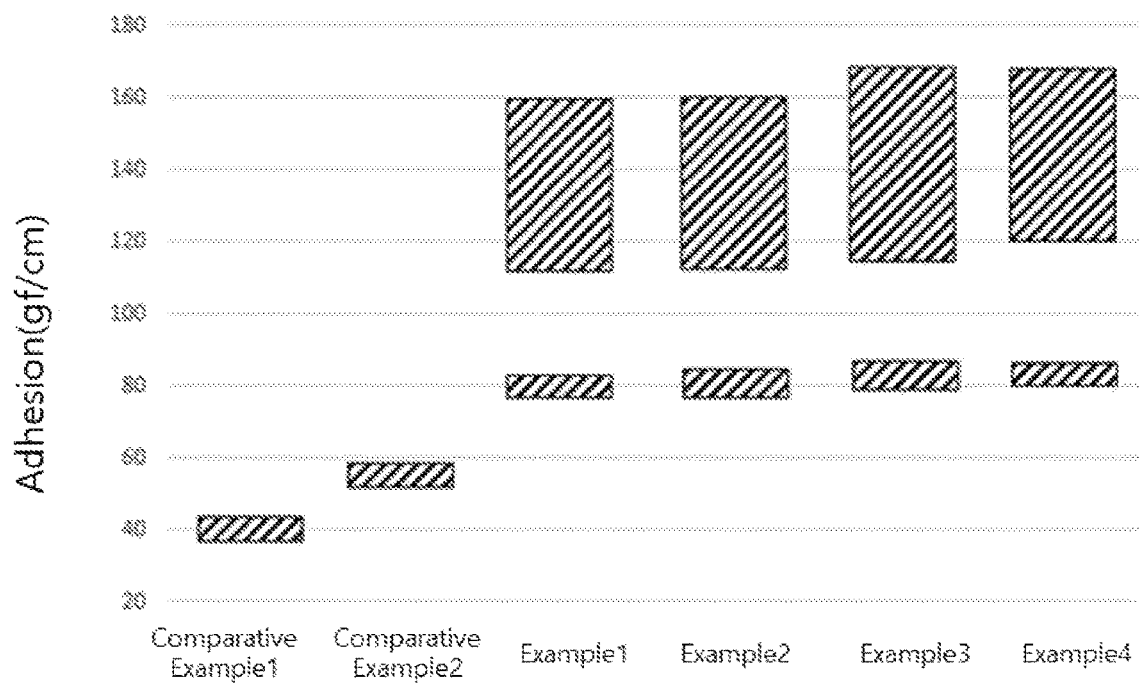
FIG. 3 is a graph showing results of an adhesion test according to Experimental Example 1.

Referring to Table 1 and FIG. 3, it can be confirmed that in Examples 1 to 4 in which the electrode mixture layer was formed in a state in which the carbon nanotube sheet was provided on the current collector with a desired thickness, excellent adhesion was obtained in comparison with Comparative Example 1 which does not include the carbon nanotube sheet and Comparative Example 2 in which the carbon nanotube sheet was excessively thin In particular, in the negative electrodes of Comparative Examples 1 and 2, the negative electrode mixture layer and the carbon nanotube sheet were deintercalated from each other immediately. On the other hand, in the negative electrodes of Examples 1 to 4, a surface portion of the negative electrode mixture layer formed on the carbon nanotube sheet was preferentially deintercalated, and then the remaining negative electrode mixture layer portion including a part of the carbon nanotube sheet was deintercalated. This indicates that adhesion of the negative electrode mixture layer to the current collector was further improved due to the carbon nanotube sheet being provided on the negative electrode of Examples 1 to 4 with a desired thickness.

In addition, it can be seen that the negative electrode of Comparative Example 2 was too thin as the carbon nanotube sheet and did not sufficiently function as a structure for improving adhesion of the negative electrode mixture layer.

On the other hand, when the carbon nanotube sheet was provided with a thicker thickness than in Examples 1 to 4, in a secondary battery to which a negative electrode with a relatively limited thickness is applied, it can be seen that capacity should decrease as the thickness of the negative electrode mixture layer decreases.

Example 5

A negative electrode mixture slurry was prepared by thoroughly mixing natural graphite as a negative electrode active material, a PVdF binder, and a natural graphite conductive material in NMP to have a weight ratio of 90:4:6 (negative electrode active material:binder:conductive material). A 5 micrometer thick carbon nanotube sheet having a porosity of 40% was placed on a 20 micrometer thick Cu foil so that a carbon nanotube sheet was completely adhered thereto. The negative electrode mixture slurry prepared above was applied thereto, dried, and rolled to prepare a negative electrode.

Example 6

The same negative electrode as in Example 5 was prepared, except that the porosity of the carbon nanotube sheet was 80%.

Comparative Example 3

The same negative electrode as in Example 5 was prepared, except that the porosity of the carbon nanotube sheet was 30%.

Comparative Example 4

The same negative electrode as in Example 5 was prepared, except that the porosity of the carbon nanotube sheet was 90%.

Experimental Example 2

Adhesion Test 2

The negative electrode prepared in each of Examples 5 and 6 and Comparative Examples 1, 3, and 4 was cut and fixed on a slide glass, and then 180-degree peel strength was measured while peeling a current collector therefrom. The results are shown in Tables 2 and FIG. 4. Evaluation was carried out by measuring the peel strengths five times in each case. In each of the above cases, peeling strength at which the negative electrode mixture layer was deintercalated and peeling strength at which the carbon nanotube sheet portion was deintercalated were successively measured to show a range.

TABLE 2

|  | Adhesion (gf/cm) when negative electrode mixture layer was deintercalated | Adhesion (gf/cm) when carbon nanotube sheet was deintercalated |
|---|---|---|
| Example 5 | 66~70 | 90~140 |
| Example 6 | 68~73 | 95~145 |
| Comparative Example 1 | 38~42 | — |
| Comparative Example 3 | 22~25 | — |
| Comparative Example 4 | 51~55 | — |

Figure 4:
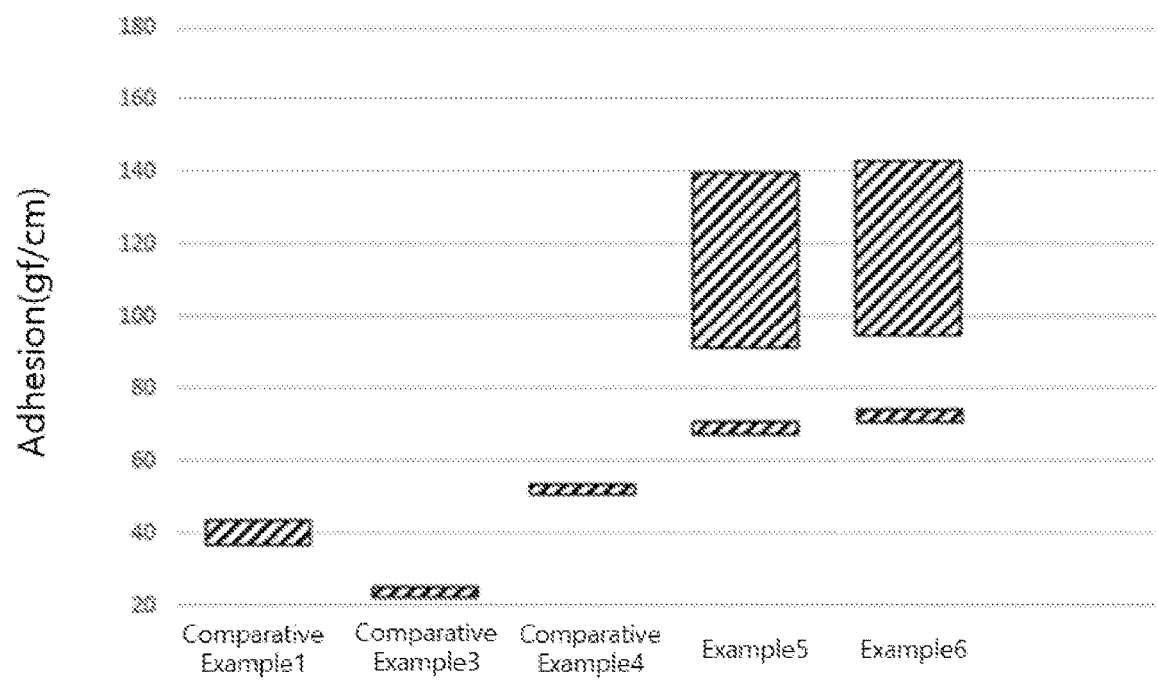
FIG. 4 is a graph showing results of an adhesion test according to Experimental Example 2.

Referring to Table 2 and FIG. 4, it can be confirmed that Examples 5 and 6 in which the electrode mixture layer was formed in a state in which a carbon nanotube sheet having porosity in a desired range was provided on the current collector exhibit excellent adhesion in comparison to Comparative Example 1 which does not include the carbon nanotube sheet and Comparative Examples 3 and 4 in which the porosity of the carbon nanotube sheet was excessively low or high.

In particular, in the negative electrodes of Comparative Examples 1, 3, and 4, the negative electrode mixture layer and the carbon nanotube sheet are deintercalated from the current collector immediately. On the other hand, in the negative electrode of Examples 3 and 4, a surface portion of the negative electrode mixture layer formed on the carbon nanotube sheet was preferentially deintercalated, and then the remaining portion of the negative electrode mixture layer containing the carbon nanotube sheet was deintercalated. This indicates that adhesion of the negative electrode mixture layer to the current collector was further improved by the carbon nanotube sheet having the porosity in the desired range being provided on the negative electrode of Examples 3 and 4.

In addition, the negative electrode of Comparative Example 3 had an excessively small porosity of the carbon nanotube sheet, and the negative electrode mixture slurry could not sufficiently penetrate into pores of the carbon nanotube sheet. Thus, the adhesion was lowered in comparison to Comparative Example 1 containing no carbon nanotube sheet. The porosity of the carbon nanotube sheet in the negative electrode of Comparative Example 4 was excessively large and a state in which the carbon nanotube sheet is in close contact with the current collector could not be easily maintained due to high permeability of the negative electrode mixture slurry. Therefore, the negative electrode of Comparative Example 4 did not sufficiently function as a structure for improving the adhesion of the negative electrode mixture layer.

Although the present disclosure has been described with reference to the accompanying drawings and embodiments thereof, it should be understood by those skilled in the art that various changes may be made without departing from the spirit and scope of the present disclosure.

The invention claimed is:

1. A method of manufacturing an electrode for a secondary battery, the method comprising:
    a) a process of simultaneously supplying and closely adhering a carbon nanotube sheet onto a current collector continuously supplied, the carbon nanotube sheet being provided as a preformed solid from a first roller, the current collector being provided from a second roller, the carbon nanotube sheet provided on one surface or both surfaces of the current collector, the carbon nanotube sheet having a sheet structure including a plurality of pores, the carbon nanotube sheet having a porosity of 40% to 80% and a thickness of 5 micrometers to 20 micrometers, the carbon nanotube sheet being supplied onto the current collector by a third roller and a fourth roller, the fourth roller simultaneously supporting the current collector and the carbon nanotube sheet on a lower surface of the current collector so that the carbon nanotube sheet is adhered to an upper surface of the current collector;
    b) a process of applying an electrode mixture slurry onto the carbon nanotube sheet placed in close contact with the current collector by applying the electrode mixture slurry in which an electrode active material, a conductive material, and a binder are mixed onto the carbon nanotube sheet provided on the one surface or both surfaces of the current collector, the electrode mixture slurry being supplied to an upper surface of the carbon nanotube sheet provided on the current collector at a slurry applying portion between the third roller and the fourth roller; and
    c) a process of drying and rolling the current collector and the nanotube sheet coated with the electrode mixture slurry to form an electrode mixture layer, such that at least a part of the electrode mixture slurry penetrates into and bonds to the pores of the carbon nanotube sheet to form the electrode mixture layer, and the carbon nanotube sheet is bonded to the current collector by the binder of the electrode mixture slurry penetrating into the pores,
    wherein the first roller is located at a same height as or at a lower height relative to an extension line connecting the third roller and the fourth roller, and the second roller is located at a lower height relative to the first roller with respect to the extension line so that the current collector is supplied to a portion opposite the slurry applying portion, so that the carbon nanotube sheet is supplied onto the current collector while the electrode mixture slurry is applied.

2. The method according to claim 1, wherein:
    in process a), carbon nanotubes are supplied to a position lower than or equal to a height at which the electrode mixture slurry is applied; and
    the current collector is supplied at a lower height when compared with the carbon nanotube sheet.

3. The method according to claim 1, wherein the carbon nanotube sheet is provided on at least 50% of a total area of the one surface of the current collector.

4. The method according to claim 3, wherein the carbon nanotube sheet is provided on 100% of the total area of the one surface of the current collector.

5. An apparatus for manufacturing the electrode using the method according to claim 1, comprising:
    the first roller on which a long sheet-like carbon nanotube sheet is wound;
    the second roller on which a long sheet-like current collector is wound;
    the third roller configured to simultaneously wind the current collector and the carbon nanotube sheet in a state in which the carbon nanotube sheet is provided on the current collector;
    the fourth roller configured to simultaneously support the current collector and the carbon nanotube sheet on a lower surface of the current collector between the first roller or the second roller and the third roller; and
    the slurry applying portion configured to apply the electrode mixture slurry to the upper surface of the carbon nanotube sheet.

6. The apparatus according to claim 5, wherein:
    the carbon nanotube sheet remains in a tensioned state due to tension applied to the carbon nanotube sheet located at a low height.

7. The apparatus according to claim 5, further comprising:
    a drying unit configured to dry the electrode mixture slurry applied onto the carbon nanotube sheet; and
    a roller configured to roll a carbon nanotube sheet disposed on the current collector and the dried electrode mixture slurry to form an electrode mixture layer.

* * * * *